(12) United States Patent
Yamamoto et al.

(10) Patent No.: US 12,523,787 B2
(45) Date of Patent: Jan. 13, 2026

(54) RADIATION DETECTOR AND METHOD FOR PRODUCING SAME

(71) Applicant: JOB CORPORATION, Yokohama (JP)

(72) Inventors: Shuichiro Yamamoto, Yokohama (JP); Masashi Yamasaki, Yokohama (JP)

(73) Assignee: Job Corporation, Kanagawa (JP)

( * ) Notice: Subject to any disclaimer, the term of this patent is extended or adjusted under 35 U.S.C. 154(b) by 299 days.

(21) Appl. No.: 18/026,412

(22) PCT Filed: Mar. 18, 2021

(86) PCT No.: PCT/JP2021/011171
§ 371 (c)(1),
(2) Date: Mar. 15, 2023

(87) PCT Pub. No.: WO2022/059234
PCT Pub. Date: Mar. 24, 2022

(65) Prior Publication Data
US 2023/0384468 A1    Nov. 30, 2023

(30) Foreign Application Priority Data
Sep. 16, 2020   (JP) .................... 2020-155406

(51) Int. Cl.
*G01T 1/24* (2006.01)
(52) U.S. Cl.
CPC .................... *G01T 1/244* (2013.01)
(58) Field of Classification Search
CPC .................... G01T 1/244; G01T 1/24
See application file for complete search history.

(56) References Cited

U.S. PATENT DOCUMENTS

| | | |
|---|---|---|
| 6,982,423 B2 | 1/2006 | Elgali |
| 7,355,642 B2 | 4/2008 | Suzuki et al. |
| 7,405,408 B2 | 7/2008 | Vogtmeier et al. |
| 7,932,499 B2 | 4/2011 | Furuichi et al. |

(Continued)

FOREIGN PATENT DOCUMENTS

| | | | |
|---|---|---|---|
| JP | 2003232858 A | * | 8/2003 |
| JP | 2004-172228 A | | 6/2004 |

(Continued)

*Primary Examiner* — Edwin C Gunberg
*Assistant Examiner* — Richard O Toohey
(74) *Attorney, Agent, or Firm* — Carrier, Shende & Associates P.C.; Joseph P. Carrier; Jeffrey T. Gedeon (57) ABSTRACT

In a method for producing a compact radiation detector 1 including a radiation detection element 2 that detects radiation incident on a top surface, and a semiconductor element 3 that is formed larger than the radiation detection element 2 in plan view, is connected to an undersurface of the radiation detection element 2, processes a signal obtained from the radiation detection element 2, and outputs an electrical signal to an outside, the radiation detection element 2 is disposed on a top surface 3a of the semiconductor element 3, and then a shield member 7 that blocks radiation is disposed in contact with a side surface 2a of the radiation detection element 2 and the top surface of the semiconductor element 3, and with a top surface of the shield member 7 out of contact with another member.

9 Claims, 4 Drawing Sheets

(56) References Cited

U.S. PATENT DOCUMENTS

| | | | | |
|---|---|---|---|---|
| 2004/0065839 A1* | 4/2004 | Elgali | ............... | G01T 1/2985 |
| | | | | 250/370.11 |
| 2007/0057192 A1* | 3/2007 | Vogtmeier | ............ | G01T 1/2019 |
| | | | | 250/370.11 |
| 2011/0198505 A1 | 8/2011 | Ishida et al. | | |
| 2018/0100937 A1 | 4/2018 | Luhta et al. | | |

FOREIGN PATENT DOCUMENTS

| | | | | |
|---|---|---|---|---|
| JP | 2005-509891 A | | 4/2005 | |
| JP | 2006-322745 A | | 11/2006 | |
| JP | 2007-514158 A | | 5/2007 | |
| JP | 2011-191290 A | | 9/2011 | |
| JP | 2015537194 A | * | 12/2015 | ......... H10F 39/8057 |
| WO | 2007/105288 A | | 9/2007 | |

\* cited by examiner

RADIATION DETECTOR AND METHOD FOR PRODUCING SAME

TECHNICAL FIELD

The present invention relates to a radiation detector that detects radiation and a method for producing the same, and specifically relates to a radiation detector that can be made compact and a method for producing the same.

BACKGROUND ART

Various radiation detectors have been proposed (see Patent Document 1, for example). Patent Document 1 discloses a configuration of a radiation detector in which a shield member with an opening portion is disposed above a radiation detection element.

The shield member covers part of the radiation detection element, thus making it difficult for radiation to reach peripheral edge portions of the radiation detection element in plan view. The peripheral edge portions of the radiation detection element cannot be effectively used in radiation detection. In the production of the radiation detector, the size of the radiation detection element is determined with the area that cannot be effectively used taken into account. This makes it difficult to make the radiation detector compact in plan view.

The shield member is disposed with a predetermined gap left between itself and the radiation detection element in the vertical direction. This makes it difficult to make the radiation detector compact in the vertical direction.

PRIOR ART DOCUMENT

Patent Document

Patent Document 1: Japanese Patent Application Kokai Publication No. 2006-322745

SUMMARY OF THE INVENTION

Problem to be Solved by the Invention

The present invention has been made in view of the above problem, and an object thereof is to provide a radiation detector that can be made compact and a method for producing the same.

Means for Solving the Problem

A radiation detector to achieve the above object is characterized in that, in a radiation detector including a radiation detection element that detects radiation incident on a top surface, and a semiconductor element that is formed larger than the radiation detection element in plan view, is connected to an undersurface of the radiation detection element, processes a signal obtained from the radiation detection element, and outputs an electrical signal to an outside, the radiation detector includes a shield member that blocks radiation, and has a configuration in which the shield member is disposed in contact with a side surface of the radiation detection element and a top surface of the semiconductor element, and with a top surface of the shield member out of contact with another member.

A radiation detector to achieve the above object is characterized in that, in a method for producing a radiation detector including a radiation detection element that detects radiation incident on a top surface, and a semiconductor element that is formed larger than the radiation detection element in plan view, is connected to an undersurface of the radiation detection element, processes a signal obtained from the radiation detection element, and outputs an electrical signal to an outside, the radiation detection element is disposed on a top surface of the semiconductor element, and then a shield member that blocks radiation is disposed in contact with a side surface of the radiation detection element and the top surface of the semiconductor element, and with a top surface of the shield member out of contact with another member.

Effects of the Invention

According to the present invention, the shield member is disposed in contact with the side surface of the radiation detection element. In this way, the entire top surface of the radiation detection element can be effectively used as a detection region. Since the detection area of the radiation detection element is larger, this is advantageous in making the radiation detector compact.

MODES FOR CARRYING OUT THE INVENTION

Radiation detectors and methods for producing the same will be described below based on embodiments illustrated in drawings. In the drawings, the arrow x indicates the crosswise direction of the radiation detectors, the arrow y indicates the lengthwise direction perpendicularly crossing this crosswise direction, and the arrow z indicates the vertical direction.

Figure 1:
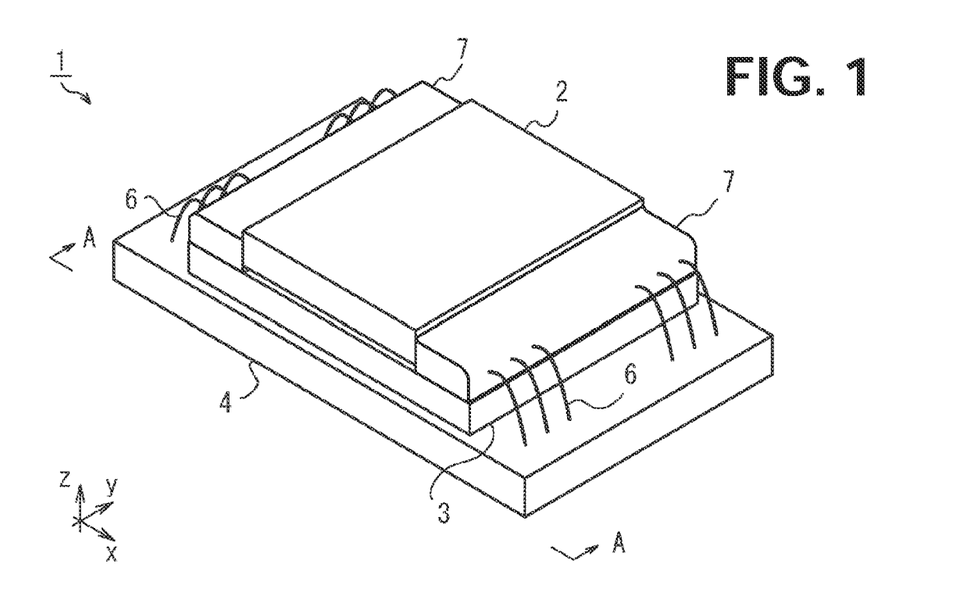
FIG. 1 is an explanatory perspective view exemplarily illustrating a radiation detector.
Figure 2:
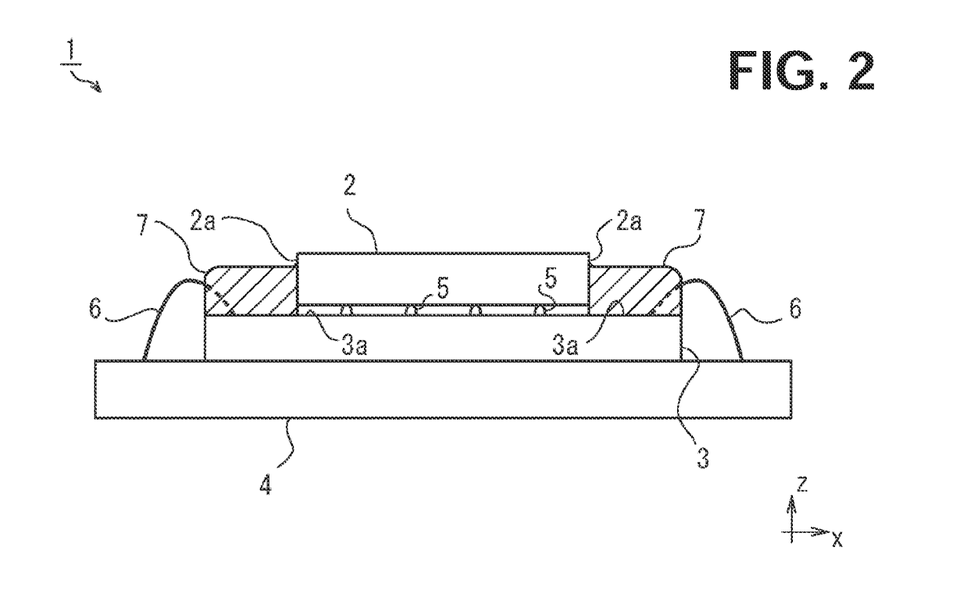
FIG. 2 is an explanatory view exemplarily illustrating the radiation detector in FIG. 1 as seen from the arrows AA.
Figure 3:
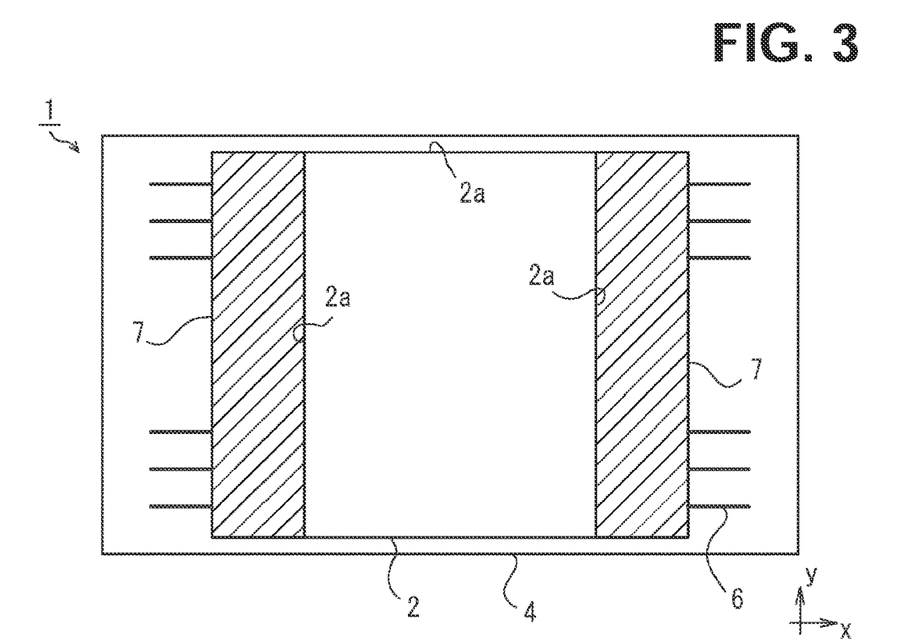
FIG. 3 is an explanatory plan view exemplarily illustrating the radiation detector in FIG. 1.

As exemplarily illustrated in FIGS. 1, 2, and 3, a radiation detector 1 includes a radiation detection element 2 that detects radiation incident on its top surface, and a semiconductor element 3 that is connected to the undersurface of the radiation detection element 2, processes signals obtained from the radiation detection element 2, and outputs electrical signals to an external mechanism. The external mechanism to which the semiconductor element 3 outputs the electrical signals is configured with a circuit board 4 disposed under the semiconductor element 3, for example.

The radiation detection element 2 has a function of converting radiation into electrical signals in response to incidence of this radiation on the top surface, and is made of a direct conversion-type semiconductor such as a CdTe (cadmium telluride)-based semiconductor, for example. This direct conversion-type semiconductor has such a composition as to see incidence radiation as photons and output electrical signals proportional to the energy of these photons. It suffices that the radiation detection element 2 have a configuration to convert radiation into electrical signals. In this embodiment, the radiation detection element 2 is formed in a cuboidal shape. The radiation detection element 2 is formed in a flat plate shape longer lengths in the crosswise direction x and the lengthwise direction y than in the vertical direction z. The radiation detection element 2 has a plurality of pixels arrayed in the crosswise direction x and the lengthwise direction y, and each pixel is capable of detecting radiation. The radiation detection element 2 is configured to measure 50 mm in the crosswise direction x, 50 mm in the lengthwise direction y, and 5 mm in the vertical direction z. The size of the radiation detection element 2 is not limited to the above, and may be changed according to the purpose of use of the radiation detector 1 or the like, e.g., to 4.0 mm in the crosswise direction x, 16.0 mm in the lengthwise direction y, and 1.5 mm in the vertical direction z.

As exemplarily illustrated in FIG. 2, the semiconductor element 3 is electrically connected to the radiation detection element 2 via a plurality of bumps 5. The undersurface of the radiation detection element 2 and a top surface 3a of the semiconductor element 3 are disposed so as to face each other. Specifically, the semiconductor element 3 is configured with a photon counting-type ASIC (application specific integrated circuit). This photon counting-type ASIC has a configuration to amplify and digitalize electrical signals obtained from the radiation detection element 2.

The combination of the radiation detection element 2 and the semiconductor element 3 is not limited to the above. For example, the radiation detection element 2 may be made of a scintillator that emits light in response to incidence of radiation. This radiation detection element 2 has a configuration to convert radiation into optical signals. In this case, the semiconductor element 3 is configured with, for example, a CMOS (Complementary Metal Oxide Semiconductor) image sensor or a photodiode. The CMOS image sensor or the like has a configuration to convert the optical signals obtained from the radiation detection element 2 into electrical signals. The undersurface of the radiation detection element 2 and the top surface 3a of the semiconductor element 3 are optically connected. Alternatively, the semiconductor element 3 may be configured with, for example, an integration-type ASIC equipped with an integration-type processing circuit. A scintillator or a direct conversion-type semiconductor may be selected for the radiation detection element 2, and an integration-type ASIC or a photon counting-type ASIC may be selected as the semiconductor element 3 to be combined with this radiation detection element 2.

Figure 4:
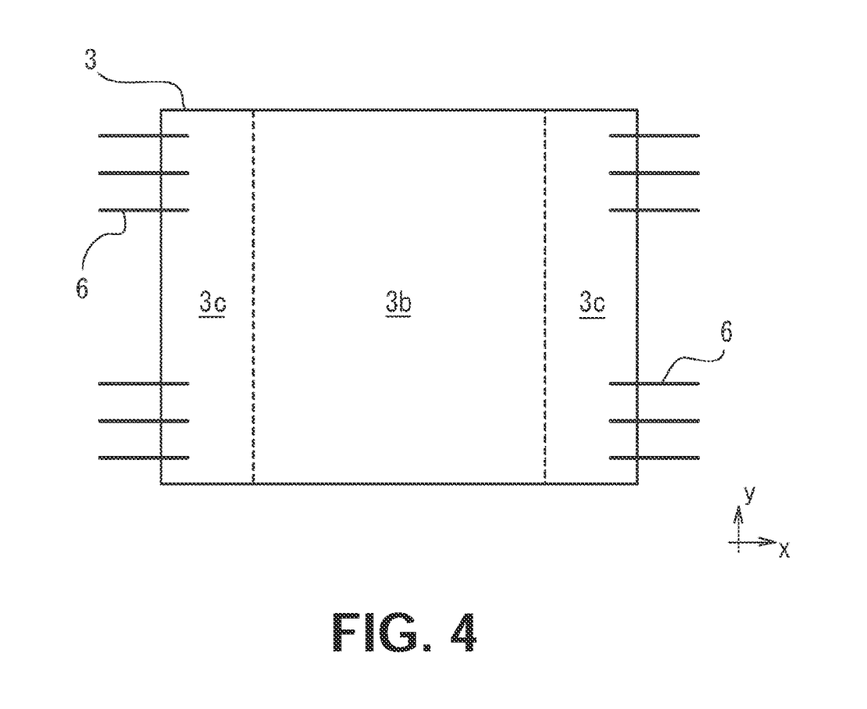
FIG. 4 is an explanatory plan view exemplarily illustrating a semiconductor element in FIG. 1.

As exemplarily illustrated in FIG. 4, the semiconductor element 3 has a processing region 3b that processes signals obtained from the radiation detection element 2, and auxiliary regions 3c being the other regions than this processing region 3b. In FIG. 4, the boundaries between the processing region 3b and the auxiliary regions 3c are depicted with dashed lines for the sake of explanation. The processing region 3b is configured of a circuit for outputting signals received from the pixels of the radiation detection element 2 as electrical signals. Specifically, the auxiliary regions 3c are configured of a data transfer circuit that externally transfers signals received from the processing region 3b, as well as an I/O driver, a constant voltage generation circuit for internal circuits, and so on. The auxiliary regions 3c are configured of MOSFETs (Metal Oxide Semiconductor Field Effect Transistors) and the like, for example.

In this embodiment, the semiconductor element 3 has the processing region 3b of the same size as the radiation detection element 2 in plan view. In the processing region 3b, circuits corresponding to the pixels of the radiation detection element 2 are formed. The auxiliary regions 3c are formed at regions which are peripheral edge portions of the semiconductor element 3 and situated outward of side surfaces 2a of the radiation detection element 2. In this embodiment, the auxiliary regions 3c are not covered by the radiation detection element 2. As exemplarily illustrated in FIGS. 2 and 3, the semiconductor element 3 is formed larger than the radiation detection element 2 in plan view. The auxiliary regions 3c have data transfer circuits that transfer signals received from the processing region 3b to the external circuit board 4 through conductive wires 6.

The configuration is not limited to the one in which the processing region 3b and the radiation detection element 2 have the same size in plan view. The radiation detection element 2 may be formed larger. For example, the radiation detection element 2 may have such a size as to cover part of the auxiliary regions 3c. In this case, the portions that cover the auxiliary regions 3c do not function as the radiation detection element 2. The processing region 3b may be formed larger. For example, the processing region 3b may have such a size as to partly stick out of the radiation detection element 2. In this case, the portions not covered by the radiation detection element 2 do not function as the processing region 3b.

The circuit board 4 is disposed with its top surface facing the undersurface of the semiconductor element 3. The semiconductor element 3 and the circuit board 4 are electrically connected by the conductive wires 6. As exemplarily illustrated in FIG. 2, the conductive wires 6 are disposed so as to connect the top surface of the semiconductor element 3 and the top surface of the circuit board 4, for example. The circuit board 4 is not limited to the configuration in which it is disposed under the semiconductor element 3. The configuration may be such that the circuit board 4 is disposed on a side of the semiconductor element 3.

The arrangement of the conductive wires 6 is not limited to the above. The conductive wires 6 may have such a configuration as to connect the undersurface of the semiconductor element 3 and the circuit board 4. However, the configuration in which the conductive wires 6 are connected to the top surface of the semiconductor element 3 is more advantageous in reducing the thickness of the radiation detector 1 in the vertical direction z. This configuration is advantageous in making the radiation detector 1 thin.

As exemplarily illustrated in FIG. 2, shield members 7 are disposed in contact with the side surfaces 2a of the radiation detection element 2 and the top surface 3a of the semiconductor element 3. The shield members 7 are disposed with the top surfaces of the shield members 7 out of contact with other members. In this embodiment, the shield members 7 are disposed at regions which are peripheral edge portions of the semiconductor element 3 and situated outward of the side surfaces 2a of the radiation detection element 2. In other words, the shield members 7 are disposed so as to cover the auxiliary regions 3c of the semiconductor element 3. The shield members 7 are desirably disposed at regions lower than the top surface of the radiation detection element 2 in the vertical direction z. In FIGS. 2 and 3, the shield members 7 are hatched for the sake of explanation. The shield members 7 are made of a material that blocks radiation. In FIG. 2, the portions of the conductive wires 6 that are buried in the shield members 7 are depicted with dashed lines for the sake of explanation.

The shield members 7 are made of, for example, a mixture of an adhesive and particles that block radiation. It suffices that the adhesive-particle mixture have such a composition as to be flowable and relatively viscous when applied, and then cure to fix the radiation detection element 2 to the semiconductor element 3. As the adhesive, an epoxy-based resin adhesive, an acrylic-based adhesive, or a urethane-based adhesive can be used, for example. Alternatively, the adhesive may be a photo-curable adhesive that cures when irradiated with ultraviolet rays.

The particles that block radiation are particles of a heavy metal such as barium, tantalum, lead, tungsten, or bismuth, for example. Alternatively, the particles may be made of a heavy metal sulfide or oxide such as barium sulfate, tantalum pentoxide, lead monoxide, or bismuth trioxide. In particular, the particles that block radiation may be made of a glass containing silicon dioxide as its main component, a light metal oxide such as aluminum oxide, or the like in a case where the energy of the radiation is relatively low, e.g., 20 keV or lower. The particles that block radiation may be made of a mixture of a plurality of kinds of particles.

A method for producing the radiation detector 1 will be described below. First, the semiconductor element 3 is disposed on and fixed to the top surface of the circuit board 4. Then, the semiconductor element 3 and the circuit board 4 are connected to each other with the conductive wires 6. The radiation detection element 2 is disposed on the top surface 3a of the semiconductor element 3. At this time, the top surface 3a of the semiconductor element 3 and the undersurface of the radiation detection element 2 are electrically connected by the bumps 5 and the like. When the radiation detection element 2 is made of a scintillator, the top surface 3a of the semiconductor element 3 and the undersurface of the radiation detection element 2 are optically connected. Then, as exemplarily illustrated in FIG. 2, the shield members 7 in the form of flowable paste are disposed between the side surfaces 2a of the radiation detection element 2 and the top surface 3a of the semiconductor element 3.

The shield members 7 each in a single chunk of paste are disposed in contact with both the side surfaces 2a and the top surface 3a. Then, as the shield members 7 cure, the side surfaces 2a of the radiation detection element 2 and the top surface 3a of the semiconductor element 3 become fixed to each other via the shield members 7. The shield members 7 are disposed so as to surround and take in part of the conductive wires 6. The shield members 7 are desirably made of an insulating material in order to keep from affecting signals that will pass through the conductive wires 6.

The thickness of the shield members 7 in the vertical direction z is adjusted as appropriate according to the strength of radiation to be applied to the radiation detector 1. The shield members 7 are put on the top surface 3a of the semiconductor element 3 to such a thickness as to sufficiently block the radiation applied. It suffices that the shield members 7 be disposed so as to cover at least part of the top surface 3a of the semiconductor element 3. It is desirable that the shield members 7 be disposed so as to cover the entire part of the top surface 3a of the semiconductor element 3 that is not covered by the radiation detection element 2. The shield members 7 may also be disposed over an area reaching the side surfaces of the semiconductor element 3 and the top surface of the circuit board 4.

The shield members 7 are disposed in contact with the side surfaces 2a of the radiation detection element 2 but not with the top surface of the radiation detection element 2. Desirably, the shield members 7 are disposed at positions lower than the top surface of the radiation detection element 2 in the vertical direction z at least at the positions where the shield members 7 contact the side surfaces 2a. With this configuration, it is possible to avoid a problem that the shield members 7 block radiation that is supposed to reach the radiation detection element 2. The entire top surface of the radiation detection element 2 can be used in radiation detection. The all pixels forming the radiation detection element 2 can be effectively used in radiation detection. The radiation detector 1 can detect a wider ray of radiation with the radiation detection element 2, which is smaller in plan view. The configuration is advantageous in making the radiation detector 1 compact.

Disposing the entire shield members 7 at positions lower than the top surface of the radiation detection element 2 in the vertical direction z is advantageous in making the radiation detector 1 compact in the vertical direction z. Even if the shield members 7 are disposed at positions higher than the top surface of the radiation detection element 2, it is desirable that the shield members 7 be disposed at positions lower than the top surface of the radiation detection element 2 at the positions where the shield members 7 contact the side surfaces 2a. This configuration can prevent attachment of the shield members 7 to the top surface of the radiation detection element 2 when the radiation detector 1 is produced.

Figure 5:
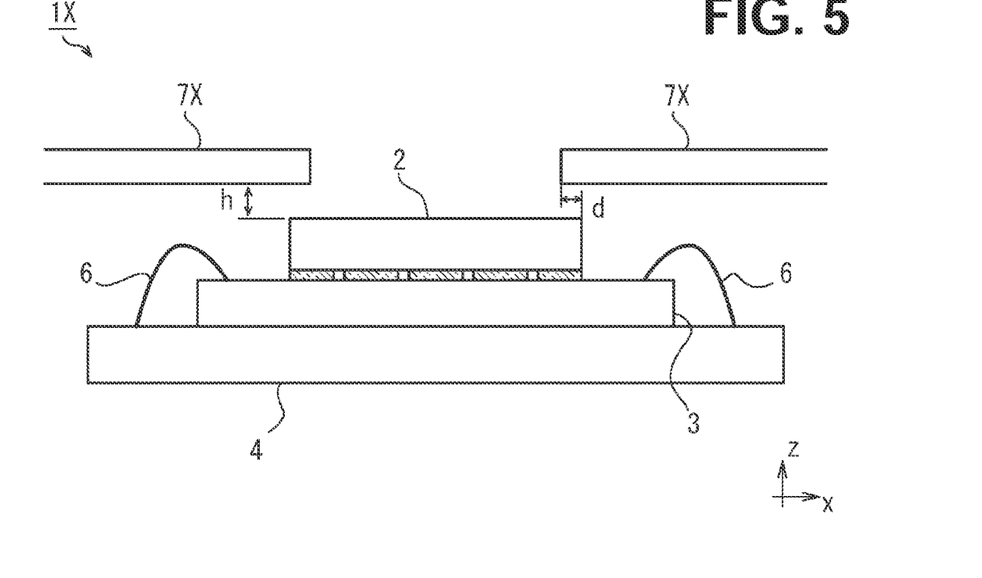
FIG. 5 is an explanatory view exemplarily illustrating a reference example of a radiation detector.

As exemplarily illustrated in FIG. 5, a conventional radiation detector 1X is configured such that shield members 7X cover peripheral edge portions of the radiation detection element 2. Specifically, the radiation detection element 2 cannot use its portions with a length d overlapping the shield members 7X in the crosswise direction x in radiation detection. This radiation detection element 2 has a plurality of pixels that cannot be used in radiation detection. Thus, the conventional radiation detector 1X must include a radiation detection element 2 larger than needed for actual detection.

As exemplarily illustrated in FIG. 5, in the conventional case, the shield members 7X cover part of the radiation detection element 2 from above. For this reason, the radiation detection element 2 and the shield members 7X need a certain gap h therebetween in the vertical direction z in order to avoid contacting each other. Making the radiation detector 1X thin, or making it small in the vertical direction z, is difficult.

In contrast, the radiation detector 1 of the present invention has the shield members 7 in contact with the side surfaces 2a of the radiation detection element 2. This is advantageous in making the radiation detector 1 thin.

The shield members 7 can be disposed in contact with the side surfaces 2a of the radiation detection element 2 with no gap therebetween. This is advantageous in improving the shield effect of the shield members 7. It is more likely to avoid a problem that radiation passes through minute gaps between the side surfaces 2a of the radiation detection element 2 and the shield members 7 and reaches the semiconductor element 3. It is possible to avoid a problem that the radiation reaching the semiconductor element 3 gradually changes characteristics of the semiconductor element 3. Being able to avoid deterioration of the semiconductor element 3 and changes in its characteristics is advantageous in maintaining the detection accuracy of the radiation detector 1. If characteristics of the semiconductor element 3 are gradually changed, the resulting deterioration of the semiconductor element 3 is unnoticeable. This leads to a problem of keeping obtaining wrong radiation images and the like.

Figure 6:
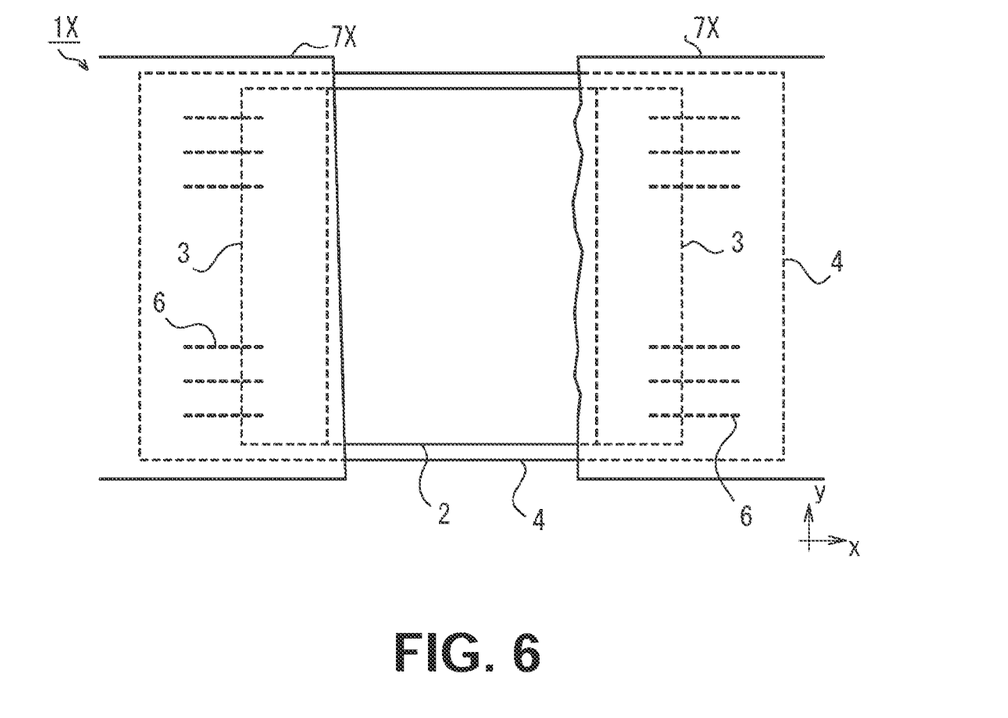
FIG. 6 is an explanatory plan view exemplarily illustrating the radiation detector in FIG. 5.

As exemplarily illustrated in FIG. 6, in the conventional case, end portions of the shield members 7X covering the peripheral edge portions of the radiation detection element 2 are disposed inclined in plan view (see the left shield member 7X in FIG. 6) and/or are not processed to be straight and have irregularities in plan view (see the right shield member 7X in FIG. 6). For this reason, the detection condition may be different for some pixels of the radiation detection element 2. Precisely positioning the shield members 7X and the radiation detection element 2 and processing the end portions of the shield members 7X accurately straight entail a problem of greatly increasing the production cost of the radiation detector 1. In FIG. 6, the portions of the radiation detection element 2 and so on covered by the shield members 7X are depicted with dashed lines for the sake of explanation.

The radiation detector 1 of the present invention is capable of detecting radiation with all pixels of the radiation detection element 2 without being affected by the shield members 7. This is advantageous in improving the radiation detection accuracy of the radiation detector 1 while significantly reducing its production cost.

The top surfaces of the shield members 7 are not covered by other members. This is advantageous in checking conditions of the shield members 7 by eye or the like. When the radiation detector 1 is produced, it is easy to check that the shield members 7 are not attached to the top surface of the radiation detection element 2 and that the shield members 7 are in intimate contact with the side surfaces 2a of the radiation detection element 2 with no gap therebetween. Also, the conditions of the shield members 7 can be checked not only during the assembly of the radiation detector 1 but also during maintenance after the passage of a predetermined period.

For example, if there are spots where the shield members 7 are locally detached from the side surfaces 2a of the radiation detection element 2, this detachment can be easily found during the maintenance. The top surfaces of the shield members 7 are exposed externally. Thus, the detachment can be easily found by eye or the like. The radiation detector 1 can be repaired by filling the detached spots with an uncured shield member 7. This is advantageous in avoiding deterioration of the semiconductor element 3 and changes in its characteristics.

Since the top surfaces of the shield members 7 are out of contact with other members, the thickness of the shield members 7 can be changed as appropriate and the shield members 7 can be put to an appropriate thickness. This makes it possible to avoid such a problem as the shield members 7 having an insufficient thickness.

Since other members are not disposed above the shield members 7, the thickness of the shield members 7 after being disposed and cured can be changed by putting additional shield members 7. For example, additional shield members 7 can be put to increase the thickness in a case where the radiation to be applied to the radiation detector 1 is to be changed to a higher output. This is advantageous in avoiding deterioration of the semiconductor element 3 and changes in its characteristics over a long period of time.

Figure 7:
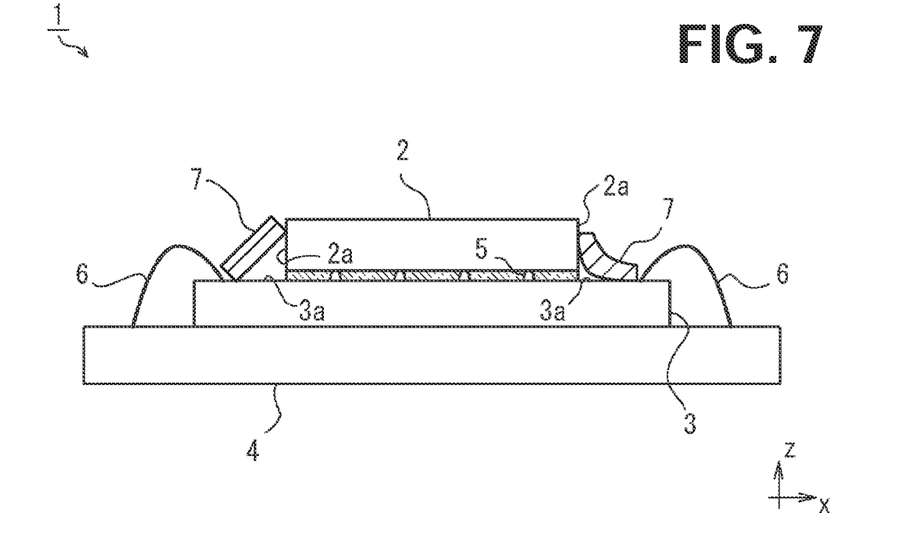
FIG. 7 is an explanatory view exemplarily illustrating a modification of the radiation detector in FIG. 2.

As exemplarily illustrated in FIG. 7, the shield members 7 may be made of film-shaped members obtained by shaping a thermoplastic elastomer with an inorganic substance dispersed therein into a film form, for example. The film-shaped members may be made by dispersing particles that block radiation in a resin material forming a film. The film-shaped shield members 7 are disposed with one end in the crosswise direction x in contact with the side surface 2a of the radiation detection element 2 and with the other end in contact with the top surface 3a of the semiconductor element 3 (see the left shield member 7 in FIG. 7). Thereafter, by being heated, the shield members 7 are deformed to be in intimate contact with the side surfaces 2a and the top surface 3a (see the right shield member 7 in FIG. 7). The shield members 7 are disposed on the radiation detection element 2 and the semiconductor element 3 with no gap therebetween. This is advantageous in preventing radiation from reaching the semiconductor element 3.

Also, the film-shaped shield members 7 can fix the radiation detection element 2 to the semiconductor element 3. This is advantageous in firmly fixing the radiation detection element 2 to the semiconductor element 3.

As exemplarily illustrated in FIG. 7, the configuration may be such that an adhesive is disposed in the gap between the undersurface of the radiation detection element 2 and the top surface of the semiconductor element 3. This is advantageous in more firmly fixing the radiation detection element 2 and the semiconductor element 3. At this time, attention is required during the production so that substances other than the adhesive, such as air bubbles, do not get in the gap between the radiation detection element 2 and the semiconductor element 3.

Nonetheless, as in the embodiment exemplarily illustrated in FIG. 2, the configuration may be such that no adhesive is disposed in the gap between the radiation detection element 2 and the semiconductor element 3. A homogeneous air layer is formed between the radiation detection element 2 and the semiconductor element 3. This can avoid a problem of adversely affecting electrical or optical signals transferred from the radiation detection element 2 to the semiconductor element 3. If a foreign substance, such as air bubbles, gets in the gap when the adhesive is disposed therein, the foreign substance will adversely affect electrical or optical signals transferred from the radiation detection element 2 to the semiconductor element 3. This adverse effect is not desirable as it influences the result of detection by the radiation detector 1.

Employing the configuration with no adhesive disposed in the gap can make the production process of the radiation detector 1 simpler and also eliminate the influence on the detection accuracy. It is desirable to employ a configuration in which the shield members 7 do not flow into the gap when the shield members 7 are made of a mixture of an adhesive and particles that block radiation as in the embodiment exemplarily illustrated in FIG. 2. When the shield members 7 are made of an adhesive and so on, adjusting the viscosity of that adhesive can prevent the shield members 7 from flowing into the gap.

For example, when the shield members 7 are made of a mixture of an epoxy-based resin adhesive and bismuth oxide in a powder form, the bismuth oxide can be mixed in an amount twice larger in volume than the epoxy-based resin adhesive. This configuration can prevent the shield members 7 from flowing into the gap between the radiation detection element 2 and the semiconductor element 3 when applied. The shield members 7 are not disposed inward of the side surfaces 2a of the radiation detection element 2 in plan view, as exemplarily illustrated in FIG. 3. That is, the shield members 7 are out of contact with the top surface of the processing region 3b of the semiconductor element 3. This is advantageous in eliminating influence on electrical or optical signals transferred from the radiation detection element 2 to the semiconductor element 3.

Figure 8:
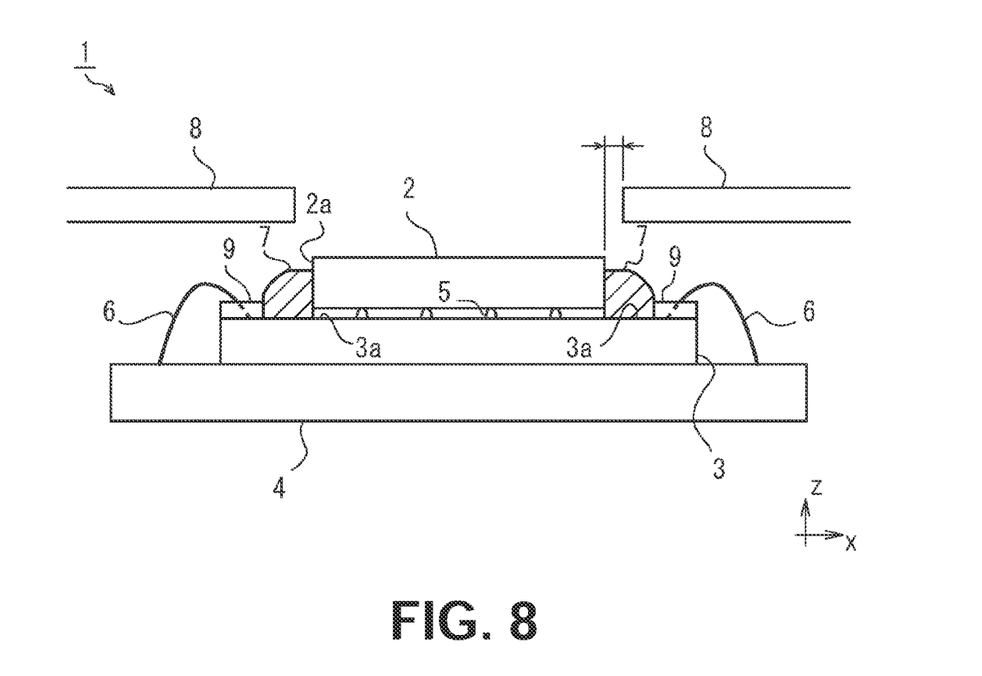
FIG. 8 is an explanatory view exemplarily illustrating a modification of the radiation detector in FIG. 2.

As exemplarily illustrated in FIG. 8, the configuration may be such that the radiation detector 1 includes covers 8 disposed above the radiation detection element 2. These covers 8 are configured with members that block radiation. The shield members 7 are disposed near the radiation detection element 2 in contact with the side surfaces 2a. Hence, the covers 8 do not need to be disposed at such positions as to cover the top surfaces of the peripheral edge portions of the radiation detection element 2. The covers 8 are disposed at positions spaced from the side surfaces 2a of the radiation detection element 2 in plan view. For example, regions near the side surfaces 2a of the radiation detection element 2 in the crosswise direction x are shielded from radiation by the shield members 7 while regions far from the side surfaces 2a are shielded from radiation by the covers 8. Installing the covers 8 can improve the radiation shield effect.

Since by the covers 8 do not cover the peripheral edge portions of the radiation detection element 2, radiation can be detected efficiently with the entire top surface of the radiation detection element 2. This is advantageous in making the size of the radiation detector 1 in plan view compact. It is desirable to employ the configuration with the covers 8 installed when the restriction on the size of the radiation detector 1 in the vertical direction z is relatively loose and at the same time it is desired to improve the shield effect. The configuration may be such that the covers 8 are lowered to such a height as to contact the shield members 7. For example, the radiation detector 1 may be configured such that the top surface of the radiation detection element 2 and the top surfaces of the covers 8 are at the same height.

When the covers 8 are disposed, the shield members 7 are disposed at gap regions between the radiation detection element 2 and the covers 8 in plan view. The top surfaces of the shield members 7 at these regions are out of contact with other members and are exposed externally. Even when the covers 8 are disposed in contact with the shield members 7, the top surfaces of the shield members 7 at the gap regions between the radiation detection element 2 and the covers 8 in plan view are out of contact other members. The state of contact between the side surfaces 2a of the radiation detection element 2 and the shield members 7 can be checked by eye or the like. Also, the thickness of the shield members 7 at the gap regions between the radiation detection element 2 and the covers 8 can be changed. The covers 8 block radiation on the portions of the shield members 7 whose top surfaces are covered by the covers 8. Hence, although conditions of those portions of the shield members 7 cannot be checked, it does not cause a problem. It suffices that conditions of at least the portions of the shield members 7 whose top surfaces are not covered by the covers 8 can be checked.

The configuration may be such that resin molds 9 are disposed at regions where the conductive wires 6 and the semiconductor element 3 are connected to each other. The configuration is advantageous in improving the insulation between the plurality of conductive wires 6 disposed and in achieving low capacitance. The configuration is advantageous in reducing signal interference between the conductive wires 6. The configuration is also advantageous in firmly fixing the conductive wires 6 to the semiconductor element 3.

In the embodiment exemplarily illustrated in FIG. 8, the configuration is such that the covers 8 are disposed above the resin molds 9. The covers 8 block radiation which would otherwise pass through the resin molds 9 and reach the semiconductor element 3. Incidentally, the configuration may be such that the shield members 7 are disposed so as to surround the resin molds 9. In this case, the configuration is such that the shield members 7 are disposed above the resin molds 9.

EXPLANATION OF REFERENCE NUMERALS 1 radiation detector
2 radiation detection element
2a side surface
3 semiconductor element
3a top surface
3b processing region
3c auxiliary region
4 circuit board
5 bump
6 conductive wire
7 shield member
8 cover
9 resin mold
x crosswise direction
y lengthwise direction
z vertical direction
d (overlapping) length
h gap (in the vertical direction z)

The invention claimed is:

1. A radiation detector including a radiation detection element, in a cuboidal shape, that detects radiation incident on a top surface, and a semiconductor element that is formed larger than the radiation detection element in plan view, is connected to an undersurface of the radiation detection element, processes a signal obtained from the radiation detection element, and outputs an electrical signal to an outside, characterized in that the radiation detector comprises a shield member that blocks radiation, and has a configuration in which the shield member is disposed outward of a side surface of the radiation detection element in plan view and is disposed in contact with a side surface of the radiation detection element with a bottom surface of the shield member against a top surface of the semiconductor element, and having one or more top surfaces opposing the bottom surface with an entirety of the one or more top surfaces of the shield member out of contact with another member.

2. The radiation detector according to claim 1, wherein the shield member is made of a mixture of an adhesive and particles that block radiation, and has such a composition as to fix the radiation detection element to the semiconductor element by curing.

3. The radiation detector according to claim 1, wherein the radiation detector has a bump disposed between the radiation detection element and the semiconductor element and electrically connecting the radiation detection element and the semiconductor element.

4. The radiation detector according to claim 1, wherein the radiation detector has a configuration in which the shield member is disposed over an area reaching a side surface of the semiconductor element.

5. The radiation detector according to claim 1, wherein the radiation detector comprises a cover that is disposed at a position spaced from the side surface of the radiation detection element in plan view and blocks radiation, and the radiation detector has a configuration in which the shield member blocks radiation incident at a region between the radiation detection element and the cover in plan view.

6. A method for producing a radiation detector including a radiation detection element, in a cuboidal shape, that detects radiation incident on a top surface, and a semiconductor element that is formed larger than the radiation detection element in plan view, is connected to an undersurface of the radiation detection element, processes a signal obtained from the radiation detection element, and outputs an electrical signal to an outside, characterized in that the radiation detection element is disposed on a top surface of the semiconductor element, and then a shield member that blocks radiation is disposed outward of a side surface of the radiation detection element in plan view and is disposed in contact with a side surface of the radiation detection element and with a bottom surface of the shield member against the top surface of the semiconductor element, and having one or more top surfaces opposing the bottom surface with an entirety of the one or more top surfaces of the shield member out of contact with another member.

7. The method for producing a radiation detector according to claim 6, wherein the shield member is made of a mixture of an adhesive and particles that block radiation, and fixes the radiation detection element to the semiconductor element as the shield member cures.

8. A radiation detector including a radiation detection element that detects radiation incident on a top surface, and a semiconductor element that is formed larger than the radiation detection element in plan view, is connected to an undersurface of the radiation detection element, processes a signal obtained from the radiation detection element, and outputs an electrical signal to an outside, characterized in that the radiation detector comprises a shield member that blocks radiation, and has a configuration in which the shield member is disposed in contact with a side surface of the radiation detection element and a top surface of the semiconductor element, and with a top surface of the shield member out of contact with another member, wherein the radiation detector comprises a gap formed between the radiation detection element and the semiconductor element in a vertical direction, and the radiation detector has a configuration in which the shield member is not disposed in the gap.

9. A method for producing a radiation detector including a radiation detection element that detects radiation incident on a top surface, and a semiconductor element that is formed larger than the radiation detection element in plan view, is connected to an undersurface of the radiation detection element, processes a signal obtained from the radiation detection element, and outputs an electrical signal to an outside, characterized in that the radiation detection element is disposed on a top surface of the semiconductor element, and then a shield member that blocks radiation is disposed in contact with a side surface of the radiation detection element and the top surface of the semiconductor element, and with a top surface of the shield member out of contact with another member, wherein the radiation detection element is disposed on the top surface of the semiconductor element with a gap formed between the radiation detection element and the semiconductor element in a vertical direction, and when the shield member is disposed, the shield member is not disposed in the gap.

* * * * *